(12) United States Patent
Morita et al.

(10) Patent No.: US 7,392,694 B2
(45) Date of Patent: Jul. 1, 2008

(54) TIRE CONDITION MONITOR DEVICE AND METHOD OF MANUFACTURING THE SAME

(75) Inventors: Satoshi Morita, Ogaki (JP); Akira Momose, Ogaki (JP); Naoki Hara, Hitachi (JP); Shigeo Sase, Hitachi (JP)

(73) Assignees: Pacific Industrial Co., Ltd., Ogaki (JP); Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/519,146

(22) Filed: Sep. 12, 2006

(65) Prior Publication Data

US 2007/0220963 A1    Sep. 27, 2007

(30) Foreign Application Priority Data

Mar. 24, 2006    (JP) .............................. 2006-082361

(51) Int. Cl.
*G01M 17/02*    (2006.01)
(52) U.S. Cl. ....................................................... 73/146
(58) Field of Classification Search .................. 73/146, 73/146.2, 146.8
See application file for complete search history.

(56) References Cited

U.S. PATENT DOCUMENTS 3,985,984 A * 10/1976 Cappa ...................... 200/61.22
6,619,110 B1 * 9/2003 Delaporte ................... 73/146.2

FOREIGN PATENT DOCUMENTS

| JP | A 62-61392 | 3/1987 |
|----|------------|--------|
| JP | A 2005-119370 | 5/2005 |

* cited by examiner

*Primary Examiner*—Andre J Allen
(74) *Attorney, Agent, or Firm*—Oliff & Berridge, PLC

(57) ABSTRACT

A tire condition monitor device includes a circuit board mounted on a tire wheel for detecting a pneumatic pressure in an interior of a tire. The circuit board is covered with urethane resin. The urethane resin has finer resin meshes as compared with the conventional silicon resin serving as a board protecting resin. Since sulfur gas and water is hard to permeate through the urethane resin, gas barrier and dampproof properties can be improved. In a method of manufacturing the tire condition monitor device, a prebaking process is carried out before a board protecting process of covering the circuit board with the urethane resin. Since moisture contained in the circuit board is vaporized, the circuit board covered with the urethane resin can reliably be protected from moisture.

8 Claims, 3 Drawing Sheets

TIRE CONDITION MONITOR DEVICE AND METHOD OF MANUFACTURING THE SAME

BACKGROUND OF THE INVENTION

1. Field of the Invention

The present invention relates to a tire condition monitor device mounted on a tire wheel of a vehicle such as automobiles and provided with a circuit board for detecting a pneumatic pressure in a tire and a method of manufacturing the tire condition monitor device.

2. Description of the Related Art

Conventional tire condition monitor devices of the above-described type comprises a circuit board on which a pressure sensor is mounted, and a casing accommodating the circuit board. For example, JP-A-2005-119370 discloses one of such conventional tire condition monitor devices. As in general electric appliances, a coating process is applied to the circuit board and the casing is then filled with silicon resin for improvement of gas barrier properties (or gas permeability) and moisture-proof properties, whereby the circuit board is protected. For example, JP-A-S62-61392 discloses such circuit board.

However, the tire condition monitor devices are used under the specific environment of being subject to a high-pressure gas containing corrosion components (sulfur constituent, for example) in a tire. Thus, further improvements in the gas barrier and moisture-proof properties have been required of the tire condition monitor devices.

SUMMARY OF THE INVENTION

Therefore, an object of the present invention is to provide a tire condition monitor device which has further improved gas barrier and moisture-proof properties and a method of manufacturing the tire condition monitor device.

In one aspect, the present invention provides a tire condition monitor device comprising a circuit board mounted on a tire wheel for detecting a pneumatic pressure in an interior of a tire, the circuit board being covered with urethane resin.

In one embodiment, the urethane resin contains a structural unit derived from polyolefin polyol and a structural unit derived from polyisocyanate.

In another embodiment, the urethane resin contains a structural unit derived from poly-α-olefin.

In another aspect, the invention provides a method of manufacturing a tire condition monitor device which is mounted on a tire wheel and includes a circuit board for detecting a pneumatic pressure in an interior of a tire, the method comprising applying heat to the tire condition monitor device so that moisture contained in the circuit board is vaporized, arranging the tire condition monitor device with residual heat due to heat-applying step in a vacuum and covering the circuit board with urethane resin.

The urethane resin is employed as a covering material in the tire condition monitor device of the present invention. The urethane resin is obtained by mixing a first compound including a second compound having two or more hydroxyl groups in at least one molecule and/or a third compound having two or more amino groups in at least one molecule, each amino group having active hydrogen, and an organic compound having two or more isocyanate groups in at least one molecule.

The second compound containing two or more hydroxyl groups in one molecule includes, for example, 1,2-propylene glycol, dipropylene glycol, 1,2-butanediol, 1,3-butanediol, 2,3-butanediol, 1,2-pentanediol, 2,3-pentanediol, 2, 5-hexanediol, 2,4-hexanediol, 2-ethyl-1,3-hexanediol, cyclohexanediol, glycerin, N,N-bis-2-hydroxypropyl aniline, N, N'-bishydroxyisopropyl-2-methylpiperazine, bisphenol A added with propylene oxide, ethyleneglycol, diethyleneglycol, 1, 3-propyleneglycol, 1,4-butanediol, 1,5-pentanediol, 1, 6-hexanediol, trimethylolpropane, pentaerythritol, dipentaerythritol, dimmer acid diol, polyetherpolyol and modified polyetherpolyol, polytetraethylene ether glycol, tetrahydrofuran/alkyleneoxide copolymer polyol, epoxy resin modified polyol, polyesterpolyol, polydiene polyol, partially saponified ethylene-vinyl acetate copolymer or each of these compounds added with hydrogen or polyol compound such as castor oil, hydrogenated castor oil or alternative to castor oil ester. Of these polyol compounds, polyolefin polyol is preferable from the view point of cracking resistance, and hydrogen-added polyol is most preferable from the view point of service life.

The above-mentioned polyol compounds may each be employed individually, or two or more polyol compounds may be mixed in use. The above-mentioned third compound with two or more amino groups each having active hydrogen includes aliphatic polyamine such as hexamethylene diamine, polyoxypropylene polyamine, etc.; alicyclic polyamine such as 3,3'-dimethyl-4,4'-diamino dicyclohexylmethane, etc.; and aromatic polyamine such as 3, 3'-dichloro-4,4'-diaminodiphenyl methane, 3, 5'-diethyltoluene-2,4-diamine, 3,5-diethyltoluene-2, 6-diamine, etc.

The first compound including the first and/or second compound has a preferable content ranging from 20 to 95 weight percentage (wt %) relative to a total amount of the urethane resin. A more preferable content ranges from 30 to 90 wt % and a most preferable content ranges from 40 to 80 wt %. The compound tends to be defective in the hardening when the content is not more than 20 wt % or when the content is not less than 95 wt %.

It is preferable that the above-mentioned organic compound should have reactive isocyanate groups to the hydroxyl groups of the second compound. The organic compound includes aromatic polyisocyanate such as tolylene diisocyanate(TDI), diphenylmethane diisocyanate(MDI), carbodiimide-modified diphenylmethane diisocyanate, polymethylene polyphenyl isocyanate, phenylene diisocyanate, naphthalene-1, 5-diisocyanate, o-toluidine diisocyanate, triphenylmethane triisocyanate, tris(isocyanatephenyl)thiophosphate, isopropyl benzene-2,4-diisocyanate, etc.; an aliphatic-aromatic polyisocyanate such as xylylenediisocyanate (XDI), tetramethylxylylene diisocyante (TMXDI), etc.; an aliphatic polyisocyanate such as hexamethylene diisocyanate, dodecane diisocyanate, lysine diisocyanate, lysineester triisocyanate, 1,6,11-undecanetriisocyanate, 1, 8-diisocyanate-4-isocyanatemethyloctane, 1,3, 6-hexamethylene triisocyanate, trimethylhexamethylene diisocyanate, etc.; an alicyclic polyisocyanate such as transcyclohexane-1,4-diisocyanate, bicycloheptane triisocyanate, isophorone diisocyanate(IPDI), dicyclohexyl methanediisocyanate(hydrogenated MDI), hydrogenated tolylene diisocyanate, hydrogenated xylylene diisocyanate, hydrogenated tetramethylxylylene diisocyanate, etc.; addition reactant of said polyisocyanate compound and polyol compound such as cyclized trimer of said polyisocyanate compound (isocyanurate modifier), burette modifier, ethylene glycol, 1,4-butanediol, propylene glycol, dipropylene glycol, trimethylolpropane, polyethelpolyol, polymerpolyol, polytetramethylene etherglycol, polyesterpolyol, acrylpolyol, polyalkadienepolyol, hydride of polyalkadienepolyol, copolymer of partially saponified ethylene and vinyl acetate, castor oil polyol, etc.

Furthermore, two or more these polyisocyanate compounds may be mixed in use. Another alternative is the use of a block isocyanate compound in which an isocyanate group of each polyisocyanate compound is blocked by a blocking agent such as phenols, oximes, imides, mercaptans, alcohols, ε-caprolactam, ethyleneimine, α-pyrolidone, diethyl malonate, sodium hydrogensulfite, boric acid, etc. Of these isocyanate compounds, liquid ones at ordinary temperature are preferable in handling ability and miscibility.

The organic compound having two or more isocyanate groups in one molecule has a preferable content ranging from 0.8 to 1.2 equivalent relative to one equivalent of a compound having hydroxyl groups and/or a compound having two or more amino groups in one molecule each amino group having active hydrogen. A substantial content preferably ranges from 1 to 30 wt % relative to total amount of urethane resin, more preferably ranges from 2 to 25 wt % or most preferably ranges from 3 to 15 wt %. Insufficient hardening tends to occur when the substantial amount is not more than 1 wt % or not less than 30 wt %.

The urethane resin in the invention may be used with a plasticizer containing no hydroxyl group. The plasticizer includes phthalic ester such as dioctyl phthalate, phosphate ester such as triphenyl phosphate, tricresyl phosphate, cresyl phenyl phosphate, etc., an olefin elasticizer such as poly-α-olefin etc. Of these plasticizers, hydrogenated ones are preferable for stability in weather resistance, and hydrogenated poly-α-olefin is particularly preferable in stability, hardenability, safety, etc. These plasticizers without hydroxyl group may be used individually or in a combination of two or more.

The aforesaid plasticizers without hydroxyl group has a content preferably ranging from 5 to 80 wt % relative to a total amount of urethane resin, more preferably ranging from 10 to 60 wt % and most preferably ranging from 30 to 50 wt %. The tensile modulus tends to be increased when the content is not more than 5 wt %. Stickiness is increased when the content is not less than 80 wt %. In each case, the plasticizers tend to be hard to use practically.

Furthermore, various types of additives may be added to the urethane resin in the invention if necessary such as a flame retardant of red phosphorus, hexabromobenzene, dibromophenyl glycidyl ether, dibromocresyl glycidyl ether, antimonous oxide, etc., coloring agent of red pigment, ferric oxide, carbon, titanium white, etc., silicon antifoams or the like. Furthermore, an inorganic filler may be used with the urethane resin, when needed. The filler may include, for example, fused silica, crystalline silica, talc, calcium carbonate, various types of glasses, silicon dioxide (quartz, quartz glass, silica gel, etc.), alumina, various types of ceramics, diatom earth, kaolin, clay mineral (montmorillonite etc.), activated earth, synthetic zeolite, mica, calcium fluoride, ytterbium fluoride, calcium phosphate, barium sulphate, zirconium dioxide, titanium dioxide, etc. These inorganic fillers may be used individually or in a combination of two or more. When a content of the inorganic filler exceeds 300 parts by weight relative to urethane resin of 100 parts by weight, the viscosity of the urethane resin is increased, whereupon the working efficiency tends to be reduced.

A silane, aluminum or titanium coupling agent may be added to the urethane resin of the invention, if necessary. The silane coupling agent may include aminosilanes such as γ-methacryloxypropyl trimethoxysilane, γ-aminopropyl triethoxysilane, γ-aminopropyl trimethoxysilane, imidazolinesilane, N-aminoethyl aminopropyl trimethoxysilane, N-phenyl-γ-aminopropyl trimethoxysilane, N-β-(N-vinylbenzylaminoethyl)-γ-aminopropyl trimethoxysilane hydrochloride, N-3-(4-(3-aminoproxy)butoxy)propyl-3-aminopropyl trimethoxysilane, and triazinesilane; epoxysilanes such as γ-glycidoxypropyl trimethoxysilane, 4-glycidylbutyl trimethoxysilane, γ-glycidoxypropylmethyldiethoxysilane, β-(3, 4-epoxycyclohexyl) ethyltrimethoxysilane, etc.; chlorosilanes such as γ-chloropropyltrimethoxysilane; and vinylsilanes such as vinyltrimethoxysilane, vinyltriethoxysilane, etc. Furthermore, the titanate coupling agent may include isopropyltriisostearoyl titanate, isopropyltris (dioctylpyrophosphate) titanate, isopropyltri (N-aminoethylaminoethyl) titanate, isopropyl tridecylbenzenesulfonyl titanate, etc. The aluminate coupling agent may include acetoalkoxyaluminum diisopropylate etc. Each coupling agent may have a content ranging from 0.5 to 2 wt % relative to polyol and polyisocyanate or more preferably ranging from 0.7 to 1.0 wt %. When the content of each coupling agent is less than 0.5 wt %, an interface between the filler and the urethane resin composition has an insufficient wettability, whereupon the moisture resistance is reduced. Furthermore, when the content of the silane coupling agent is more than 2 wt %, the agent remains in the urethane resin composition as unreacted component, whereupon the urethane resin tends to be difficult to harden.

The urethane resin has a tensile modulus of not more than 5 MPa at 25° C. More preferably, the tensile modulus of the urethane resin ranges from 0.01 to 5.00 MPa, much more preferably from 0.02 to 3.00 MPa. Most preferably, the tensile modulus ranges from 0.1 to 2.0 MPa. When the tensile modulus of the urethane resin is not more than 0.01 MPa, the effect of protecting a base material tends to be reduced. When the tensile modulus is 5.00 MPa or more, thermal shock tends to result in crack, damage of the base material, etc.

In the above-described tire condition monitor device, the circuit board is covered with the urethane resin. The urethane resin has a finer resin network than a silicon resin conventionally used for protection of the board. Since a sulfur gas and moisture become hard to pass through the resin network, the gas barrier property and moisture-proof property can be improved.

Furthermore, in the method of manufacturing the tire condition monitor device, the heat-applying step is carried out before the step of covering the circuit board with urethane resin. Since moisture contained in the circuit board is evaporated, the circuit board covered with the urethane resin can reliably be protected from moisture. Additionally, after circuit board protecting step, hardening step is carried out in which heat is applied to the tire condition monitor device at or above 100° C. for more than one hour. Consequently, an internal stress of the post-hardened urethane resin can be reduced.

BRIEF DESCRIPTION OF THE DRAWINGS

Other objects, features and advantages will become clear upon reviewing the following description of the embodiment, with reference to the accompanying drawings, in which.

DETAILED DESCRIPTION OF THE INVENTION

Figure 1:
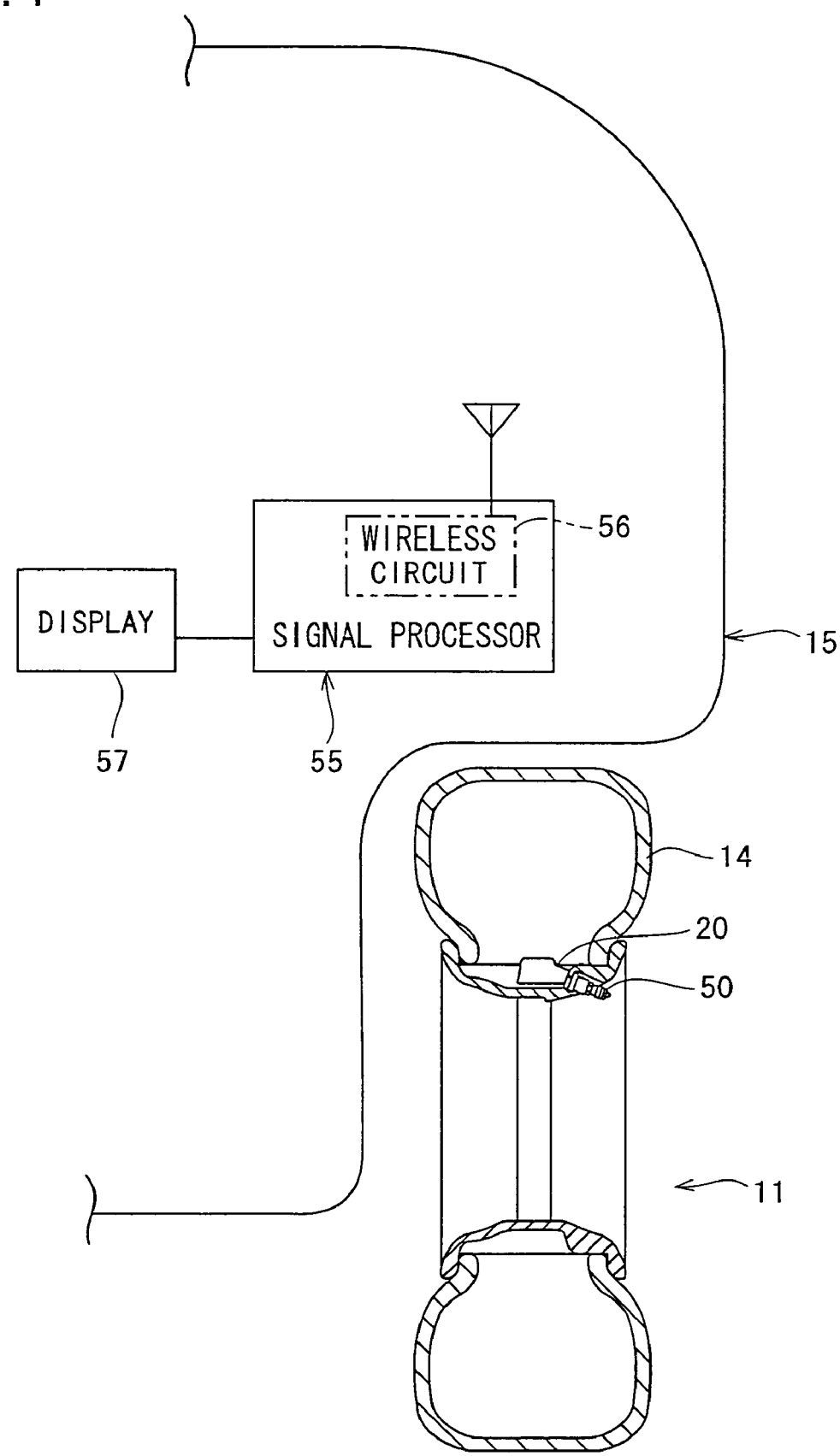
FIG. 1 is a conceptual illustration of a vehicle provided with a tire condition monitor device of one embodiment in accordance with the present invention.
Figure 2:
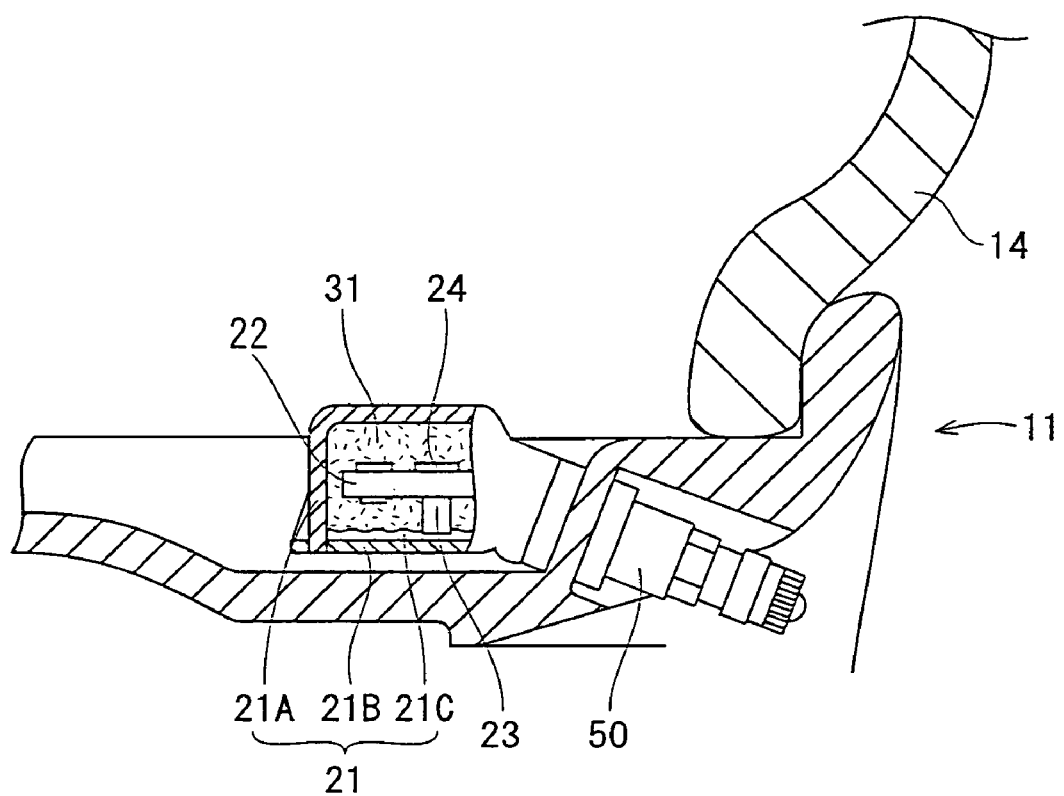
FIG. 2 is a side sectional view of the tire condition monitor device.

One embodiment of the present invention will be described with reference to the accompanying drawings. Referring first to FIG. 2, the tire condition monitor device 20 of the embodiment comprises a case 21 accommodating therein a circuit board 22 and microcell (not shown). The case 21 includes a case body 21A having an open end 21C and a closure plate 21B closing the open end 21C of the case body 21A. Four tire condition monitor devices 20 are mounted on four wheels 11 of a vehicle respectively together with tire valves 50 as shown in FIG. 1, though only one of the wheels 11 is shown. The tire condition monitor devices 20 are disposed in enclosed space of tire 14 mounted on the wheels 11 respectively.

The case 21 is made from a composition comprised of 6, 6-nylon added with reinforcement such as glass fiber. However, the case 21 may be made from a composition comprised of 6,6-nylon added without the reinforcement. The case 21 may be made from another composition comprised of poly phenylene sulfide (PPS) added with or without reinforcement such as glass fiber.

On the circuit board 22 are mounted a pressure sensor 23, a wireless circuit 24, a temperature sensor (not shown), an acceleration sensor (not shown), a communication controller (not shown) and the like. The pressure sensor 23 is disposed at the open end 21C side of the case body 21A on the circuit board 22. The pressure sensor 23 has a pressure-sensitive surface 23A located on an end at the side spaced away from the circuit board 22.

The aforesaid communication controller carries out a predetermined program when the acceleration sensor has detected a centrifugal force due to rotation of the wheel 11. The wireless circuit 24 transmits by radio the pressure and temperature in the tire 14 detected by the respective pressure sensor 23 and temperature sensor. On the other hand, as shown in FIG. 1, a vehicle body 15 is provided with a signal processor 55 having another wireless circuit 56. The wireless circuit 56 receives the radio signal delivered by the tire condition monitor device 20, and for example, information about the tire conditions (pressure and temperature or presence or absence of abnormality) is displayed on a display 57 provided in a vehicle interior.

The interior of the case 21 is filled with a board protecting resin 31. The board protecting resin 31 is an urethane resin made by three-dimensionally crosslinking polyolefin by urethane bond. The board protecting resin 31 is poured into the case 21 in a molten state to be hardened, thereby covering an entire circuit board 22 except the pressure sensitive surface 23A of the pressure sensor 23.

The tire condition monitor device 20 thus constructed is manufactured in the following method. Firstly, the circuit board 22 and other components are accommodated in the case 21. The closure plate 21B is kept detached from the case body 21A. Furthermore, the tire condition monitor device 20 is also kept unfixed to the tire valve 50. A plurality of tire condition monitor devices 20 are fixed to respective jigs with the open end 21C of the case body 21A being directed upward, for example.

Subsequently, a prebaking process of the present invention is carried out. For this purpose, the above-described jigs and a plurality of tire condition monitor devices 20 are carried into a heating chamber so that heat is applied to the jigs and tire condition monitor devices 20 at 120° C. over one hour. Thereafter, the jigs and tire condition monitor devices 20 are taken out of the heating chamber, and a board protecting process of the invention is carried out. For this purpose, the jigs and tire condition monitor devices 20 are carried into a vacuum chamber while heat due to the prebaking process is remaining in the tire condition monitor devices 20. For example, an industrial robot with a nozzle 30 mounted thereon is provided in the vacuum chamber. The nozzle 30 is connected to an injector (not shown). An interior of the injector is filled with the board protecting resin 31 in the molten state. The board protecting resin 31 comprises a chief material containing hydrogenated isoprene polyol and hydrogenated poly-α-olefin and liquefaction degenerated 4, 4'-dipheyl methane diisocyanate, as a hardener, mixed with the chief material.

Figure 3:
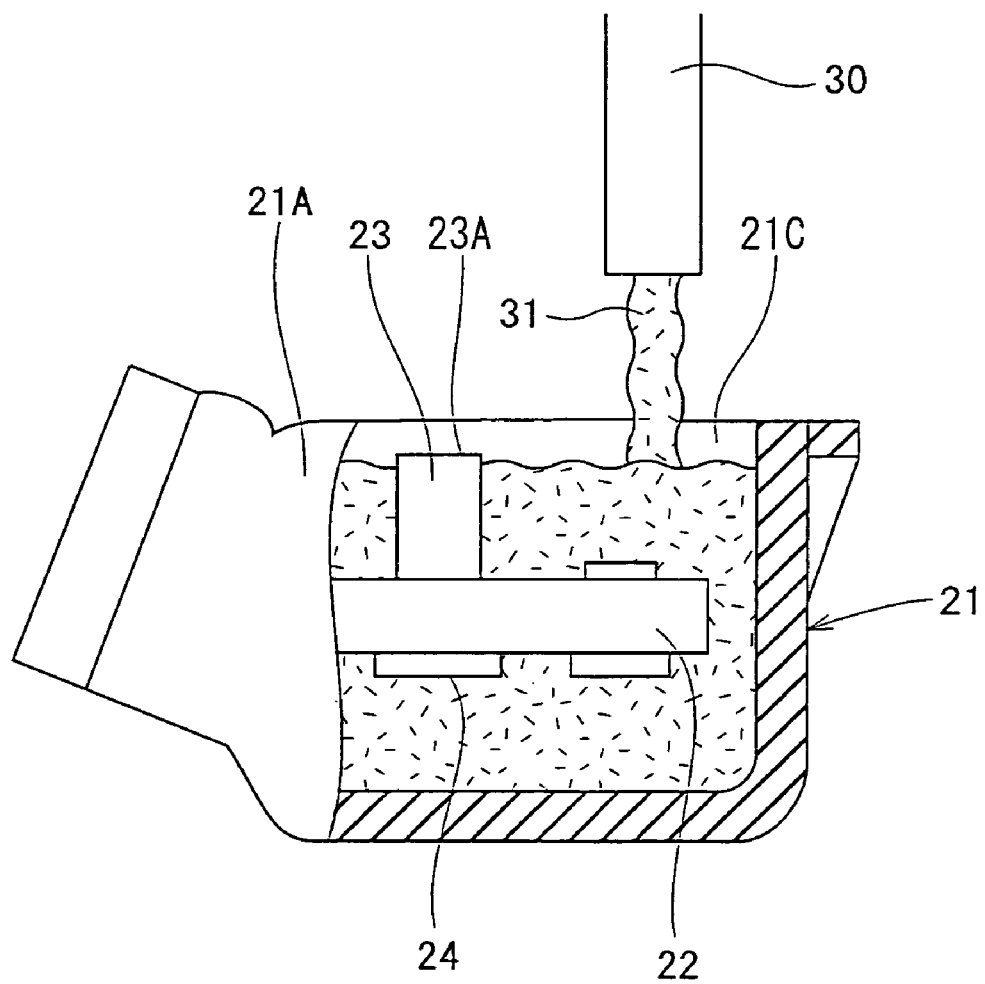
FIG. 3 is a side sectional view of the tire condition monitor device in a circuit board protecting step.

The nozzle 30 is moved over the tire condition monitor devices 20 by the robot so that the molten board protecting resin 31 is discharged from the nozzle 30. As a result, the case 21 of each tire condition monitor device 20 is filled with the board protecting resin 31. In this case, the position of the robot is controlled so that the molten board protecting resin 31 is firstly poured into a gap between side edges of the circuit board 22 and an inner surface of the case 21. Next, the molten board protecting resin 31 is poured below the circuit board 22 and thereafter, the nozzle 30 is operated so that an entire surface except for the pressure sensor 23 of the circuit board 22 at the open end 21C side is covered with the molten board protecting resin 31. The board protecting process is completed after the whole circuit board 22 except for the pressure sensitive surface 23A of the pressure sensor 23 is covered with the board protecting resin 31, as shown in FIG. 3.

Subsequently, the tire condition monitor devices 20 are taken out of the vacuum chamber and then re-carried into the heating chamber for a hardening process of the invention. Heat is applied to the tire condition monitor devices 20 at 100° C. for one hour in the hardening process. The tire condition monitor devices 20 are then taken out of the heating chamber and the closure plate 21B is attached to the open end 21C of the case body 21A after natural cooling. The tire valve 50 is fixed to the case 21 of each tire condition monitor device 20, whereby the manufacturing process is completed.

According to the tire condition monitor device 20 thus manufactured, water contained in the circuit board 22 is evaporated in the prebaking process executed before the board protecting process. Accordingly, the circuit board 22 covered with the board protecting resin 31 can reliably be protected from moisture. However, the prebaking process may be eliminated when no moisture is present on the surface of the circuit board 22. Furthermore, since the board protecting resin 31 comprises an urethane resin made by three-dimensionally crosslinking polyolefin by urethane bond, the tire condition monitor devices 20 can be improved in the gas barrier property and dampproof property for the following reason as compared with the conventional construction using a silicon resin as the board protecting resin 31: polyolefin that is a main component of the board protecting resin 31 has a shorter chain length as compared with the silicon resin, and a loose binding force mutually acts between polyolefin chains. Accordingly, the board protecting resin 31 (urethane resin) has finer resin meshes as compared with the conventional silicon resin serving as the board protecting resin. Since sulfur gas and water is hard to permeate through the board protecting resin 31, the gas barrier and dampproof properties can be improved as compared with the conventional structure. Additionally, since polyolefin has high hydrophobicity, waterproof property can be improved in this respect, too.

The silicon resin serving as the conventional board protecting resin comprises organo polysiloxane (silicone oil) three-dimensionally crosslinked by polyfunctional low-molecular polysiloxane. Since polyfunctional low-molecular polysiloxane in the silicone resin has a similar structure to glass, the silicone resin has low adhesiveness to materials other than glass although having high adhesiveness to glass. On the other hand, the urethane bond in the board protecting resin 31 in the above embodiment has polarity. Accordingly, high adhesiveness is achieved regardless of selection of material. This enables the board protecting resin 31, the circuit board 22 and the case 21 to be prevented from being delaminated. Thus, the gas barrier property and dampproof property can be improved in this respect, too. Furthermore, the conventional coating process becomes unnecessary.

The invention will be described by way of examples in more detail. However, the invention should not be limited to these examples.

EXAMPLE 1

An insulating constituent was prepared from a blending composition and a blending amount as shown in TABLE 1. Materials A and B were agitated at 1000 rpm for 5 minutes using a lab stirrer. The materials A and B are then vacuum-defoamed at 10 Torr for 5 minutes and thereafter subjected to heat at 100° C. for one hour. Curing was then carried out at 23° C. for 48 hours, whereby hardened materials were sampled. Characteristics of the hardened materials were measured by the following method. TABLE 1 shows results of the measurement. Used substances are as follows:

Hydroxyl-containing liquid polyisoprene: EPOL (trade name of product made by Idemitsu Petrochemical Co., Ltd.)

Hydrogenated poly-α-olefin: PAO (trade name of product made by Idemitsu Petrochemical Co., Ltd.)

Liquefaction degenerated 4,4'-dipheyl methane diisocyanate: LF-1209 (trade name of product made by Guntsman)

Dehydrating agent: Molecular sieve 3AB (trade name of product made by UNION SHOWA K.K.)

(1) Modulus of Elongation

A modulus of elongation was measured according to a JIS K6251 tensile test for vulcanized rubber using a specimen of dumbbell No. 3.

(2) Gas Permeability (Gas Barrier Property)

A permeability coefficient of hydrogen gas was measured according to a JIS K7126 differential pressure method as a method of gas permeability test for plastic film and sheet when the hardened material had a thickness ranging from 0.3 mm to 0.4 mm.

(3) Moisture Permeability

A moisture permeability of water was measured according to a JIS Z0208 method of moisture permeability test for moisture-proof packing material when the hardened material had a thickness ranging from 0.3 mm to 0.4 mm.

(4) Adhesiveness to the Case

Necessary force was obtained when the hardened material bonded to a case made from 6,6-nylon was to be removed.

TABLE 1

| Items | Embodiment 1 | Compared example 1 |
|---|---|---|
| Composition Material A (parts by weight) | | |
| Hydrogenated isoprene polyol | 100 | — |
| Hydrogenated poly-α-olefin | 75 | — |
| Dehydrating agent | 2 | — |
| Material B (parts by weight) | | |
| Liquefaction degenerated 4,4'-dipheyl methane diisocyanate | 19.5 | — |
| Silicon compound (parts by Weight) | — | 100 |
| Modulus of elongation [MPa] | 0.9 | 0.5 |
| Gas Permeability [mol · n/m$^2$ · s · Pa] | $2.38 \times 10^{14}$ | $2.14 \times 10^{-13}$ |
| Moisture permeability [g/m$^2$ · 24 h] | 14 | 145 |
| Adhesiveness to the case [MPa] | 0.79 | 0.26 |
| Viscosity [Pa · s] | 5.3 | 8.7 |
| Thixotropy [—] | 1.03 | 1.07 |

TABLE 1-continued

| Items | Embodiment 1 | Compared example 1 |
|---|---|---|
| Can stability [—] | Ordinary temperature | ≦10° C. |
| Specific gravity [—] | 0.93 | 1.01 |

The foregoing description and drawings are merely illustrative on the principles of the present invention and not to be construed in a limiting sense. Various changes and modifications will become apparent to those of ordinary skill in the art. All such changes and modifications are seen to fall within the scope of the invention as defined by the appended claims.

What is claimed is:

1. A tire condition monitor device comprising:
   a circuit board mounted on a tire wheel for detecting a pneumatic pressure in an interior of a tire, the circuit board being covered with urethane resin.

2. The tire condition monitor device according to claim 1, wherein the urethane resin has a tensile modulus of not more than 5 MPa at 25° C.

3. The tire condition monitor device according to claim 1, wherein the urethane resin contains a structural unit derived from polyolefin polyol and a structural unit derived from polyisocyanate.

4. The tire condition monitor device according to claim 2, wherein the urethane resin contains a structural unit derived from polyolefin polyol and a structural unit derived from polyisocyanate.

5. The tire condition monitor device according to claim 3, wherein the urethane resin contains a structural unit derived from poly-α-olefin.

6. The tire condition monitor device according to claim 4, wherein the urethane resin contains a structural unit derived from poly-α-olefin.

7. A method of manufacturing a tire condition monitor device which is mounted on a tire wheel and includes a circuit board for detecting a pneumatic pressure in an interior of a tire, the method comprising:
   arranging the tire condition monitor device in a vacuum and covering the circuit board with urethane resin.

8. A method of manufacturing a tire condition monitor device which is mounted on a tire wheel and includes a circuit board for detecting a pneumatic pressure in an interior of a tire, the method comprising:
   applying heat to the tire condition monitor device so that moisture contained in the circuit board is vaporized; and
   arranging the tire condition monitor device with residual heat due to the heat-applying step in a vacuum and covering the circuit board with urethane resin.

* * * * *